United States Patent [19]

Pillsbury et al.

[11] 4,112,675
[45] Sep. 12, 1978

[54] APPARATUS AND METHOD FOR STARTING A LARGE GAS TURBINE HAVING A CATALYTIC COMBUSTOR

[75] Inventors: Paul W. Pillsbury, Wallingford; Serafino M. DeCorso, Media, both of Pa.

[73] Assignee: Westinghouse Electric Corp., Pittsburgh, Pa.

[21] Appl. No.: 728,334

[22] Filed: Sep. 30, 1976

Related U.S. Application Data

[63] Continuation-in-part of Ser. No. 613,842, Sep. 16, 1975, abandoned.

[51] Int. Cl.² .............................................. F02C 7/26
[52] U.S. Cl. .................................. 60/39.06; 60/39.14; 60/39.82 C; 431/6; 431/268; 431/328
[58] Field of Search ............. 60/39.06, 39.02, 39.82 C, 60/39.69 A, 39.04; 431/6, 268, 328, 147

[56] References Cited

U.S. PATENT DOCUMENTS

| | | | |
|---|---|---|---|
| 2,655,786 | 10/1953 | Carr | 60/39.82 C |
| 3,577,731 | 5/1971 | Bruchez | 60/39.82 C |
| 3,797,231 | 3/1974 | McLean | 60/39.82 C |
| 3,943,705 | 3/1976 | DeCorso | 60/39.82 C |

*Primary Examiner*—Clarence R. Gordon
*Attorney, Agent, or Firm*—F. A. Winans

[57] ABSTRACT

Apparatus and method for starting a gas turbine engine is shown wherein the combustion chamber has a fixed geometry providing a high throughput velocity to prevent flashback during normal operation of the engine. Thus, there is provided a flame holding zone out of the main flow path through the chamber that exhausts into the chamber upstream of a catalytic reactor element to preheat the catalyst to a sufficiently high temperature for continuous auto-combustion therein prior to the rotor of the engine attaining running speed. After running speed the combustion in the flame holding zone is extinguished and the velocity of the fuel/air mixture in the main flow path through the chamber is sufficient to maintain the combustion within the catalytic element for the continuous running of the engine without any flashback.

7 Claims, 2 Drawing Figures

APPARATUS AND METHOD FOR STARTING A LARGE GAS TURBINE HAVING A CATALYTIC COMBUSTOR

This application is a continuation-in-part of application Ser. No. 613,842, filed Sept. 16, 1975 and assigned to the same assignee as this application and now abandoned.

BACKGROUND OF THE INVENTION

1. Field of the Invention

The invention relates to the apparatus and a method of starting the combustion process in a fixed geometry combustor of a large gas turbine engine utilizing a catalytic element for promoting relatively low temperature auto-combustion and relying on a high throughput velocity to prevent flashback of the combustion process upstream of the catalyst.

2. Description of the Prior Art

Combustion chambers for large gas turbine engines utilizing a catalyst for supporting catalytic combustion are presently being investigated because of their ability to provide a relatively low temperature combustion zone relatively free of $NO_x$ gases.

It is generally well known that various high temperature catalysts promote combustion under a wide range of ratios and temperatures of the air/fuel mixture etc., but, as a general rule, the leaner the fuel mixture the greater the temperature within the catalyst must be to support auto-ignition and sustained auto-combustion. (See for example U.S. Pat. No. 3,797,231). The catalyst can be heated to the elevated auto-combustion temperature in many various ways such as passing the combustion air/fuel mixture through a heat exchanger, then through the catalyst until the auto-ignition temperature is attained as shown in the above-identified patent. After the rotor shaft has been brought up to running speed, the elevated temperature of the discharge air of the compressor associated with the gas turbine engine is generally sufficient to maintain the air/fuel mixture and the catalyst at a temperature able to maintain the conditions within the combustor capable of continuous auto-combustion.

It is important, however, to make certain that the maximum temperature of the catalytic element does not exceed approximately 2300° F. Above this temperature the catalytic material tends to fuse or flow, thereby decreasing its effective surface area necessary for the proper catalytic activity. For the most part, the temperature is regulated and maintained within acceptable limits by the relative richness of the air/fuel mixture. However, even with a desirable mixture, there can be occasional flashbacks wherein combustion occurs upstream of the catalytic element producing hot streaks in excess of 3000° F. Flame detectors are normally employed to detect when this happens and reduce the fuel until the upstream combustion is extinguished.

To minimize such occurrence it is beneficial to have a sufficiently high velocity through the combustor, that prevents i.e., by blowing out, any flashback and maintains the combustion process within the catalytic reactor element. Thus, under operating conditions of a combustion chamber having a catalytic reactor therein a high throughput velocity is desirable.

Since such high throughout velocity, under cranking condition wherein the turbine is being started, tends to put a large volume of relatively cool air through the combustor, which is contrary to the heated condition desirable for rapidly heating the catalytic element, and also tends to extinguish any standing pre-heating flame within the combustor upstream of the catalyst, combustors having variable geometry wherein the air entry into the chamber can be regulated have been proposed. (See FIG. 1 of above-identified patent). However, in large gas turbines it is generally undesirable to have moving parts in the high temperature zones such as the combustor.

The present invention provides apparatus and a method for heating the catalytic reactor element in the combustion chamber of a large gas turbine engine to its auto-combustion temperature wherein the chamber has a fixed (i.e., non-variable) geometry providing a high throughput velocity to prevent flashback during normal continuous operation.

SUMMARY OF THE INVENTION

The gas turbine engine of the present invention includes a compressor and a power turbine in fluid flow communication through a fixed geometry combustion chamber housing a catalytic reactor element across the main flow path defined by the chamber. The upstream end of the chamber is substantially open to the discharge of the compressor to provide a high throughout velocity to prevent flashback during normal operation. A torch chamber formed in one wall of the combustion chamber defines a volume into which air and fuel are delivered out of the main flow path of the combustion chamber for exhausting into the chamber upstream of the catalyst, through an enlarged outlet defining a flame holding zone. Fuel and high pressure air (i.e., from a supplemental compressor) are delivered to the torch chamber, with the high pressure air atomizing the fuel and supporting continuous combustion therein once it is spark ignited.

The combustion gases from the torch flow into the main flow of air through the combustion chamber, and, being at a very high temperature, mingle therewith to provide relatively high temperature gases upstream of the catalyst for heating the catalyst to an auto-combustion temperature. At such time, as sensed by a pyrometer, fuel is introduced into the main flow stream through the combustor, and is combusted in the catalytic reactor element providing a motive force to bring the engine up to idle speed at which time the torch combustion is extinguished and the main fuel is regulated in accordance with the power output demand for the turbine.

In this manner, combustion is maintained in the torch during startup in a position (i.e., a flame holding zone) where it will not be extinguished by the high velocity through the main flow path of the combustor, and thus provides heat-up of the catalyst with a fixed geometry combustor. Further, the combustion in the torch produces relatively high velocity gases which assist in accelerating the turbine to running speed.

REFERENCE TO OTHER APPLICATIONS

Copending applications Ser. Nos. 524,292, and 482,911 now U.S. Pat. Nos. 3,943,705 and 3,938,326, respectively, and Ser. No. 625,739 are assigned to the assignee of the present application and refer to specific arrangements for a catalytic combustor for a gas turbine engine. To the extent they generally sufficiently describe the combustion chamber in combination with other components of the gas turbine engine and also to the extent they identify certain known catalytic elements appropriate for use in such a combustion chamber, they are herein incorporated by reference.

DESCRIPTION OF THE PREFERRED EMBODIMENT

Figure 1:
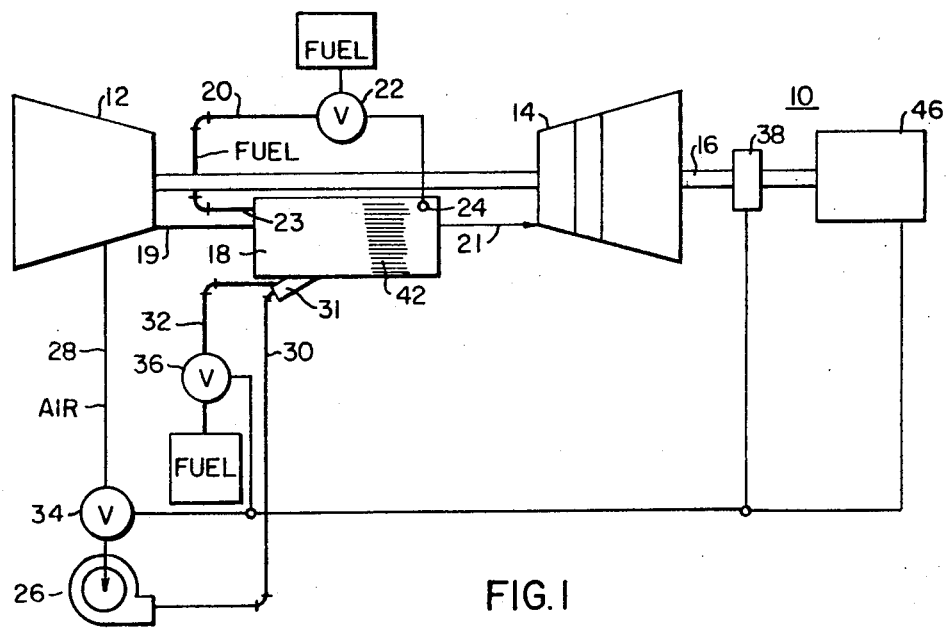
FIG. 1 is a schematic view of a gas turbine engine having a catalytic combustion chamber and appropriate structure for starting the chamber in accordance with the method of the present invention.

With reference to the above-identified co-owned patents and application and U.S. Pat. Nos. 3,846,979 and 3,797,231, the advantages of a gas turbine engine utilizing a catalytic combustor to provide lower temperature combustion are generally well known. Thus, referring to FIG. 1, sufficient apparatus of a gas turbine engine is shown to describe a method of starting combustion in such a catalytic combustor in order to bring the turbine from a non-operating condition up to running speed whereupon it is maintained at running speed through combustion in the catalytic element of the combustor. The gas turbine engine 10 of FIG. 1 therefore comprises a main compressor 12 and a power turbine 14, the rotating parts of which are connected to a common single rotor shaft 16. A combustion chamber 18 is interposed between the compressor discharge 19 and the turbine inlet 21 so that the pressurized air from the compressor 12 enters the combustor for supporting combustion therein, the exhaust being directed to the rotor blades of the turbine for driving the rotor shaft 16.

Fuel is delivered to a fuel nozzle 23 at the upstream end of the chamber through a fuel line 20 so as to enter the combustion chamber along with the discharge air from the compressor. In this instance, an electrically controlled valve 22 is shown in the fuel line for controlling the fuel feed rate. In accordance with the present invention the valve 22 is controlled through a temperature sensing probe 24 disposed within the combustion chamber 18.

Also, in accordance with the present invention, a supplemental compressor 26 is provided having an inlet 28 in flow communication with the main compressor 12. The outlet 30 of the supplemental compressor 26 is in communication with a torch chamber 31 which in turn exhausts into the combustion chamber 18 in generally the upstream end. Also, a supplemental fuel supply line 32 is provided which communicates with the supplemental compressed air for atomizing the fuel and introducing an air/fuel mixture into the torch chamber 31. As is seen, both the supplemental air line 28 and the fuel line 32 have electrically actuated valves 34 and 36 controlled by a speed sensing means 38 associated with the rotor shaft 16.

To generally complete the required components of the combustion chamber, an igniter means such as a spark igniter 40 is retractably disposed in the torch chamber 31 and an array of a high temperature gas igniting catalytic element 42 is disposed in the downstream portion of the combustion chamber 18. External drive means, such as a motor 46, is also connected to the shaft 16 to initiate rotation of the rotor and air flow through the main compressor into the combustion chamber 18.

Figure 2:
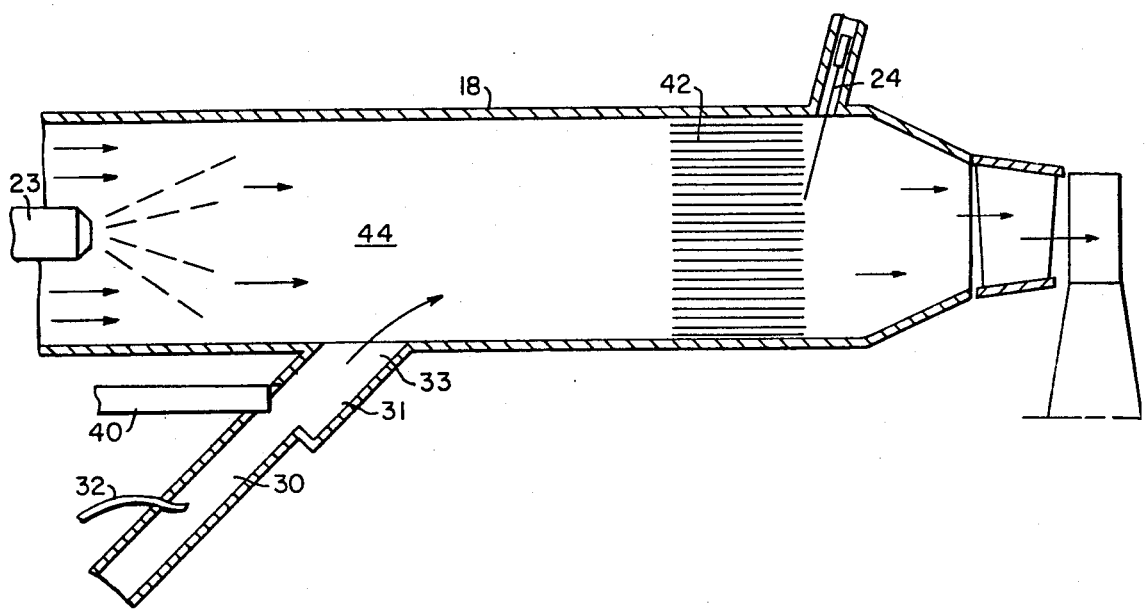
FIG. 2 is a schematic elevational cross-sectional view of a catalytic combustor for use in FIG. 1.

Referring now to FIG. 2, it is to be noted that the supplemental air/fuel mixture is delivered to the torch chamber 31 which exhausts into the combustor 18, well upstream of the catalytic element 42 and into a zone of the chamber 18 generally referred to as a fuel preparation zone 44 wherein the main fuel is evenly distributed in the flow path for presentation to the downstream catalytic reactor element. It is noted that the discharge end of the torch chamber 31 is enlarged to form a flame holding volume 33 into which the igniter 40 projects for initial ignition, with continuous combustion thereafter occurring in the flame holding zone as long as the supplemental air and fuel are delivered thereto. Also, the temperature probe 24 is located downstream of the catalytic element 42 to sense the temperature of the gases exiting the element. It should also be noted that the combustion chamber is open at the upstream end in a fixed geometry for receiving the discharge of the main compressor.

The method of starting the turbine engine will now be described with reference to the apparatus disclosed in FIGS. 1 and 2.

To start the air flow through the combustor 18 from the main compressor 12, the rotor shaft 16 is rotated from the external power supply or motor 46. At such initial low speeds, the compression is small and the temperature of the incoming air is insufficient to heat the catalytic element 42 to a temperature wherein auto-ignition occurs. In fact, at such low speed the compressor acts like a fan and cools the downstream components whereas it is necessary to raise the temperature of the catalyst to an auto-ignition temperature which for the fuel ratios generally encountered in the gas turbine, is on the order of 400° F as shown in FIG. 2 of U.S. Pat. No. 3,797,231. Thus, some air from the discharge portion of the main compressor is fed to the auxiliary compressor 26 through the open valve 34. (The auxiliary compressor 26 could also be driven by the motor 46.) This supplemental compressed air is delivered to the torch chamber 31 at the discharge end of the supplemental air line 30 concomitantly with auxiliary fuel, which itself is controlled through a normally open valve 36, and mingled with the auxiliary air in an area of high velocity for atomization therein so as to prevent flashback thereinto from the flame holding zone 33. The mixture of atomized supplemental fuel and air enters the flame holding zone 33 and is ignited by the spark igniter 40 whereupon the combustion of this mixture becomes continuous. The hot mixture passes out of the flame holding zone and into the main fuel preparation zone 44 for flow into and through the catalytic reactor element, thereby heating the catalyst and providing some motive force to the rotor blades.

In addition to providing a high pressure air source for atomizing the fuel in the torch chamber, the supplemental compressor is necessary to force a sufficiently large mass of air through the torch chamber 31, so that at low cranking speeds of the turbine, at which time as previously stated the main compressor is performing much like a large fan having a cooling effect on downstream components, the heated mass of air exhausting the torch chamber when added to the main flow through the combustion chamber, results in a heated fluid entering the catalytic element at a temperature, that over a period of time, will heat the element to the auto-combustion temperature. The catalyst temperature is continuously monitored by the probe to indicate when the catalytic element can support auto-ignition therein.

During this portion of the startup procedure, it is to be understood that preferably no fuel is delivered to the discharge air of the main compressor 12. However, it is conceivable that not all the fuel delivered to the torch chamber 31 will be combusted therein, and thus some fuel may enter the combustion chamber. This fuel may be ignited in the combustion chamber by the flame in the flame holding zone extending into the main combustion chamber which would again tend to produce hot streaks in the fluid flowing into the catalyst that may, if allowed to continue, exceed the maximum permissible temperature. It is expected that any ignition that may occur in the combustion chamber upstream of the catalyst will be extinguished as the main compressor accelerates since the area is relatively small and the velocity of the air flow therein will be greater than the flame propagation velocity.

Upon the probe 24 sensing a predetermined elevated temperature indicating the catalytic element is sufficiently heated to support auto-combustion, which condition occurs at a relatively low rpm of the rotor so that the heat introduced by the torch flame maintains the mass flow through the catalytic element at a temperature capable of heating the catalyst to the auto-combustion temperature, the valve 22 of the main fuel line is opened. This delivers fuel to the fuel/air preparation zone 44. The main fuel and air mixture is adjusted to prevent a temperature of over 2000° C occurring which would damage the catalytic element 42. This air and fuel enters the catalytic element 42 where it is combusted, further heating the element and delivering an ever increasing working fluid to the turbine rotor to provide increasing driving force for rotating the shaft. This process then continues with the fuel mixture in the fuel preparation zone maintained sufficiently lean so that no upstream combustion occurs except for the flame in the torch 30. However, once combustion is initiated in the catalytic element, the rpm of the rotor starts increasing to the extent that the heat added by the torch becomes insignificant compared to the mass flowing through the combustor. Thus, during this portion of the procedure, combustion within the catalytic element provides the main source of heat for maintaining the element at an auto-combustion temperature. However, the torch can continue to operate as a further heat source.

Once the rotor shaft 16 has attained an idle running speed, the speed sensing mechanism 38 actuates the valves 34, 36 to a closed position to eliminate the torch flame. (The mechanism also can be employed to deenergize the external power supply and the drive of the supplemental compressor.) At this time the main fuel supply, in conjunction with the discharge air of the compressor 12, provides a mixture too lean for auto-combustion without the aid of the catalytic element 42. Further, the discharge temperature of the compressor 12 has now been elevated to approximately 650° F which is sufficient to maintain the air/fuel mixture in the catalytic element within the temperature range for continuous operation. The main fuel supply is then controlled in conjunction with the loading of the rotor shaft as is known for continuous operation of the gas turbine engine. It is noted that even at these elevated temperatures for the main fuel/air mixture, the high throughput velocity prevents any flashback of the combustion and thus maintains all combustion within the catalytic element.

Thus, a basic starting procedure is described which is applicable to a fixed geometry combustion chamber configuration having a catalytic combustion element, for rapidly heating the catalytic element to an auto-ignition temperature and establishing a high throughout velocity to prevent flame propagation to an upstream position of the element during running conditions. In this manner rotor shaft of the gas turbine engine quickly attains a running speed after which continuous auto-combustion is maintained within the catalytic element for low $NO_x$ operation of the gas turbine.

What we claim is:

1. A method of starting continuous catalytic supported combustion in a gas turbine engine having a main compressor and a turbine in fluid flow communication through a fixed geometry combustion chamber housing the catalytic reactor element therein, said method comprising:

rotating the shaft of said main compressor from an external power source to initiate at least some flow from said main compressor to said turbine through said catalytic reactor element;

delivering compressed air from a supplemental compressor to a flame holding combustion zone out of the path but in flow communication with the main flow through said combustion chamber upstream of said catalytic reactor element;

delivering fuel for mixture with said air in said flame holding zone;

igniting said air/fuel mixture in said flame holding zone for self-sustaining continuous combustion therein;

passing the hot gases of combustion in said zone into the main path of said combustion chamber for flow through said catalytic reactor element to heat said element;

monitoring the temperature of said element and upon said element attaining an auto-combustion temperature therein, initiating main fuel delivery into the main flow of said combustion chamber upstream of said catalytic reactor element for combustion of said main fuel therewithin; and subsequently terminating the delivery of fuel and air to said flame holding combustion zone to extinguish combustion upstream of said cataytic reactor element and regulating the supply of main fuel into said combustion chamber in accordance with the load on said engine.

2. The method of claim 1 wherein said fuel and air delivery to said flame holding zone is terminated upon said catalytic reactor element attaining an auto-combustion temperature.

3. The method of claim 1 wherein the delivery of said fuel and air to said flame holding combustion zone is terminated in accordance with the shaft of said main compressor attaining a predetermined rotative speed.

4. The method of claim 3 wherein said predetermined speed is the normal idle speed of said gas turbine engine.

5. In a gas turbine engine having a compressor and turbine in fluid flow communication through a combustion chamber having a fixed geometry entry for admitting air from the compressor therethrough, and a main fuel nozzle for discharging fuel into said air flow, said chamber having opposed walls for housing a catalytic reactor element therebetween substantially downstream of said entry for effecting combustion of said air and fuel flowing therethrough upon said element having an auto-combustion temperature, and means for heating said element to said temperature comprising:

means defining a flame holding combustion zone out of the fluid flow path through said combustion chamber, said means directing the exhaust of said combustion to enter said combustion chamber upstream of said catalytic reactor element;

supplemental air compressor means and means for delivering air from said supplemental compressor to said flame holding combustion zone;

means for delivering fuel to said flame holding combustion zone for mixture with said supplemental air;

means for igniting said air/fuel mixture in said flame holding combustion zone for subsequent continuous combustion therein;

whereby the exhaust of said combustion in said flame holding zone enters the combustion chamber for entry into said catalytic reactor element to heat said element to said auto-combustion temperature with said combustion in said zone remaining uneffected by the velocity of fluid passing through said combustion chamber.

6. Structure according to claim 5 wherein said combustion chamber having a fixed geometry entry defines a substantially open inlet end for receiving the discharge from said main compressor.

7. Structure according to claim 6 wherein said supplemental air delivery means and said fuel delivery means to said flame holding combustion zone include means for terminating the respective flows therethrough, said last named means employed subsequent to said catalytic reactor element attaining an auto-combustion temperature.

* * * * *